United States Patent [19]

Alewelt et al.

[11] 4,147,707

[45] Apr. 3, 1979

[54] GLASS FIBER-REINFORCED POLYCARBONATES WITH IMPROVED MECHANICAL PROPERTIES CONTAINING 0.5 TO 5.0% OF ORGANOPOLYSILOXANE

[75] Inventors: Wolfgang Alewelt; Dieter Margotte; Hugo Vernaleken; Horst-Günter Kassahn, all of Krefeld, Fed. Rep. of Germany

[73] Assignee: Bayer Aktiengesellschaft, Leverkusen, Fed. Rep. of Germany

[21] Appl. No.: 679,108

[22] Filed: Apr. 21, 1976

[30] Foreign Application Priority Data

Apr. 24, 1975 [DE] Fed. Rep. of Germany ....... 2518287

[51] Int. Cl.$^2$ .............................................. C08L 69/00
[52] U.S. Cl. ............................. 260/37 SB; 260/37 PC
[58] Field of Search ......... 260/47 XA, 37 SB, 37 PC, 260/29.1 SB, 824 R

[56] References Cited

U.S. PATENT DOCUMENTS

| | | | |
|---|---|---|---|
| 3,577,378 | 5/1971 | Streib et al. | 260/37 PC |
| 3,639,331 | 2/1972 | Hattori et al. | 260/37 PC |
| 3,751,519 | 8/1973 | Bostich | 260/29.1 SB |
| 3,933,730 | 1/1976 | Hoogeboom | 260/37 PC |
| 3,971,756 | 7/1976 | Bialous et al. | 260/45.7 R |

FOREIGN PATENT DOCUMENTS

2535263  2/1976  Fed. Rep. of Germany ...... 260/37 PC

*Primary Examiner*—Joseph L. Schofer
*Assistant Examiner*—Peter F. Kulkosky
*Attorney, Agent, or Firm*—Gene Harsh; Lawrence S. Pope

[57] ABSTRACT

Glass fiber reinforced polycarbonate molding compositions are taught which have improved mechanical properties. This improvement is achieved by incorporating between about 0.5 to 5 wt.% of organopolysiloxanes into the composition. The compositions of this invention have improved impact, notched impact and elongation properties without a loss in elastic modulus.

2 Claims, No Drawings

GLASS FIBER-REINFORCED POLYCARBONATES WITH IMPROVED MECHANICAL PROPERTIES CONTAINING 0.5 TO 5.0% OF ORGANOPOLYSILOXANE

FIELD OF THE INVENTION

The present invention relates to glass fiber-reinforced, high-molecular, thermoplastic aromatic polycarbonates containing 0.5–5% by weight of a polysiloxane.

It is known to reinforce high-molecular thermoplastic aromatic polycarbonates with glass fibers in order, for example, to increase the stiffness of the thermoplastic moulding compositions. Such compositions are described, for example, in U.S. Pat. No. 3,577,378. The disadvantages of these glass fiber-reinforced polycarbonates are that their tough and elastic properties are deficient compared with those of the unreinforced polycarbonate.

Numerous attempts have been made to compensate for this disadvantage, for example by adding auxiliaries and additives.

Thus, in U.S. Pat. No. 3,640,943, polysiloxane-polycarbonate block copolymers are used to improve the notched impact strength of glass fiber-reinforced polycarbonates. The explanation given in U.S. Pat. No. 3,640,943, column 1, lines 47 et seq., for this improvement in properties is that the additive employed (polysiloxane-polycarbonate block copolymer) acts as a mediator providing compatibility between glass fibers on the one hand and the thermoplastic polycarbonate on the other hand.

Disadvantages of this process method lie, for example, in the fact that only a few mechanical properties (notched impact strength) of the polycarbonates containing glass fibers are improved.

SUMMARY OF THE INVENTION

It has now been found, surprisingly, that thermoplastic moulding compositions comprising:

(A) About 45–89.5% by weight of high-molecular thermoplastic polycarbonates based on diphenols, especially on dihydroxydiaryl-alkanes or -cycloalkanes of the formula 1

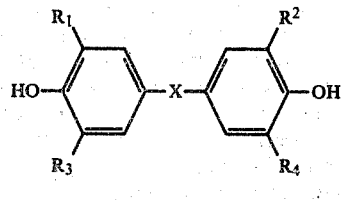

wherein $R_1$ to $R_4$ are identical or different and denote H, $C_1$–$C_8$ alkyl, Cl or Br and X denotes $C_1$–$C_8$ alkylene, $C_2$–$C_8$ alkylidene, $C_5$–$C_{15}$ cycloalkylene or $C_5$–$C_{15}$ cycloalkylidene, (B) about 10–50% by weight of glass fibers and (C) about 0.5–5% by weight, preferably 1.5–4% by weight, of organopolysiloxanes which have a viscosity between about 5 and 300,000 cSt at 20° C. and which are obtained by hydrolysis or cohydrolysis of the monomers (2),

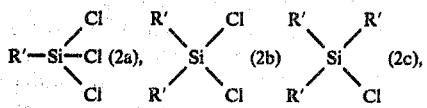

in which

R' is H, $C_1$–$C_6$ alkyl or phenyl and in which the sum of the percentages by weight of A+B+C, based on the total weight of A+B+C, is 100 in each case, possess surprisingly good combinations of properties.

DETAILED DESCRIPTION OF THE INVENTION

The moulding compositions according to the invention display, on the one hand, the stiffness and dimensional stability typical for glass fiber-reinforced polycarbonates and, on the other hand, the tough and elastic properties typical for unreinforced polycarbonates. In view of U.S. Pat. No. 3,640,943, this effect was not to be expected due to the incompatibility of polycarbonates and polysiloxanes.

A further advantage of the moulding compositions according to the invention is that mouldings with a high glass content and thus with a high modulus of elasticity and the good tough and elastic properties mentioned can be produced easily therefrom.

Thus, by means of the combination of properties mentioned, a material is provided for a range of applications which no other industrially accessible material has hitherto been able to satisfy.

The moulding compositions according to the invention can be used wherever there are high demands with regard to dimensional stability and excellent tough and elastic properties. Moreover, new applications can be opened up where additional impact stresses are demanded, as, for example, for the production of amusement machines, cigarette slot machines, parking meters, base portions of switch boxes, cameras, binoculars, chassis of all types, such as slide projectors, housings for electrical measuring instruments and the like.

High-molecular, thermoplastic aromatic polycarbonates in the sense of the present invention are those which are obtainable by reacting diphenols, especially dihydroxydiarylalkanes or -cycloalkanes, with phosgene or diesters of carbonic acid according to known processes, for which reaction, in addition to the unsubstituted dihydroxydiaryl-alkanes or -cycloalkanes, those in which the aryl radicals are substituted in the o-position to the hydroxyl group according to formula 1 are also suitable. These polycarbonates can also be branched in a known manner.

Polycarbonates which are suitable according to the invention have average molecular weights ($\overline{M}_w$=average weight) between about 10,000 and 100,000, preferably between about 20,000 and 40,000, which can be determined from the relative viscosity of the polycarbonates (measured in $CH_2Cl_2$ at 25° C. and a concentration of 0.5% by weight).

Examples of suitable diphenols are hydroquinone, resorcinol, 4,4'-dihydroxydiphenyl, bis-(hydroxyphenyl)-alkanes, such as, for example, $C_1$–$C_8$-alkylene- and $C_2$–$C_8$-alkylidene-bisphenols, bis-(hydroxyphenyl)-cycloalkanes, such as, for example, $C_5$–$C_6$-cycloalkylene- and $C_5$–$C_6$-cycloalkylidene-bisphenols, bis-(hydroxyphenyl) sulphides, bis- (hydroxyphenyl) ethers, bis-(hydroxyphenyl) ketones, bis-(hydroxyphenyl)-sulphoxides or bis-(hydroxyphenyl)-sulphones, as well as α,α'-bis-(hydroxyphenyl)-diisopropylbenzene and the corresponding compounds which are alkylated or halogenated in the nucleus. Polycarbonates based on 2,2-bis-(4-hydroxyphenyl)-propane (bisphenol A), 2,2-bis-(4-hydroxy-3,5-dichloro-phenyl)-propane (tetrachlorobisphenol A), 2,2-bis-(4-hydroxy-3,5-dibromo-phenyl)-propane (tetrabromobisphenol A), 2,2-bis-(4-hydroxy-3,5-dimethyl-phenyl)-propane (tetramethylbisphenol A), 2,2-bis-(4-hydroxy-3-methyl-phenyl)-propane and 1,1-bis-(4-hydroxy-phenyl)-cyclohexane (bisphenol Z) as well as those based on bisphenols with three nuclei such as α,α'-bis-(4-hydroxyphenyl)-p-diisopropylbenzene, are preferred.

Other diphenols which are suitable for the preparation of polycarbonate are described in U.S. Pat. Nos. 3,028,265, 2,999,835, 3,148,172, 3,271,368, 2,991,273, 3,271,367, 3,280,078, 3,014,891 and 2,999,846 as well as in German Published Specifications 2,063,050 (LeA 13,359), 2,063,052 (Le A 13,425), 2,211,957 (Le A 14,240) and 2,211,956 (Le A 14, 249).

Suitable glass fibers in the sense of the present invention are all the commercially available sorts and types of glass fibers, that is to say cut glass filaments (long glass fiber and short glass fiber), rovings or staple fibers, insofar as they have been provided with a polycarbonate-compatible finish by means of suitable sizes.

The length of the glass filaments, whether or not they have been bundled to form fibers, should be between about 60 mm and 6 mm in the case of long glass and the maximum length should be between about 5 mm (5,000 μm) and 0.05 mm (50 μm) in the case of short glass.

Two types of glass fiber are particularly preferred:

I. Long glass fiber with an average length of fiber of about 6,000 μm, a diameter φ of about 10 μm and a powder content (<50 μm) of about 1% by weight, and II. ground short glass fiber with an average length of fiber of about 230 μm, a diameter φ of about 10 μm and a powder content (<50 μm) of about 5% by weight.

Alkali-free aluminium-boron silicate glass ("E glass'-')or alkali containing "C glass" can be used as the glass material.

The sizes known from the literature can be used as suitable sizes and the water size (compare DT-AS (German Published Specification) 1,201,991) known for short glass fibers has proved particularly suitable for polycarbonate compositions.

Further details regarding glass fibers and their use in plastics and particularly in polycarbonates are known from "Harro Hagen, Glasfaserverstärkte Kunststoffe" (Glass Fiber-Reinforced Plastics) Springer-Verlag, Berlin, Göttingen, Heidelberg, 1961 (especially pages 182-252) and from U.S. Pat. No. 3,577,378 (Ue 2159-Cip)).

Organopolysiloxanes according to the present invention are known industrially and are produced, for example, by hydrolysis or co-hydrolysis of the monomers (2)

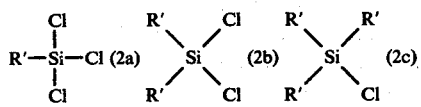

wherein

R' denotes H, $C_1$–$C_6$ alkyl or phenyl.

Monomers of this type are, for example, methyltrichlorosilane, dimethyldichlorosilane, trimethylchlorosilane, phenyltrichlorosilane, diphenyldichlorosilane, triphenylchlorosilane, methylphenyldichlorosilane, dimethylphenylchlorosilane, methyldiphenylchlorosilane, ethyltrichlorosilane, diethyldichlorosilane or triethylchlorosilane.

The viscosity of the organopolysiloxanes to be employed according to the invention should be between about 5 and 300,000 cSt at 20° C.

Polydimethylsiloxanes which have a viscosity in a range from about 5–300,000 cSt at 20° C. and polymethylphenylsiloxanes which have viscosity in a range from about 5–1,000 cSt at 20° C. are preferably employed. The hydrolysis or cohydrolysis of the organohalogenosilanes of the formula 2 in order to prepare suitable organopolysiloxanes can be carried out, for example, according to the summary in "Noll, Chemie und Technologie der Silicone" (Noll, Chemistry and Technology of Silicones), 1968, Verlag Chemie, Weinheim, Bergstrasse, chapter 5, page 163–168, or to the statements in "W. R. Sorenson and F. W. Campbell: Präparative Methoden der Polymeren Chemie" ("Preparative Methods in Polymer Chemistry") 1962, Verlag Chemie, Weinheim/Bergstrasse, Chapter 5/VI, page 249–253, by hydrolysing organohalogenosiloxanes, in, for example, ethereal solution, with excess water at about room temperature, whilst stirring vigorously; some cyclic products having degrees of polymerisation of 3–9 can form during the hydrolysis of diorganodihalogenosilanes and these can then be condensed with acids, with opening of the ring, to give high molecular linear products.

The molecular weights, and thus the viscosity ranges, can be set as desired by customary methods, for example by using a molecular weight regulator, organopolysiloxanes with, for example, trimethylsiloxane or triphenylsiloxane end groups being formed. The viscosities of the organopolysiloxanes are measured according to customary methods, for example in a Höppler falling ball viscometer.

Those polysiloxanes which have —Si—Oh end groups are particularly suitable. Products of this type and the preparation thereof are described, for example, in "Noll, Walter, Chemie and Technologie der Silicone, ("Chemistry and Technology of Silicones"), 1968, Verlag Chemie, Weinheim, Bergstrasse, chapter 5, page 162 et seq., or in U.S. Pat. No. 3,651,174.

In principle, mixing of the components A, B and C to prepare the moulding compositions according to the invention can be effected in two ways.

1. The polycarbonate is mixed with the organopolysiloxane in an extruder at temperatures between 260° and 320° C. and the desired quantity of glass fibers is added to this mixture, thus obtained, by known processes, for example in a kneader or a twin screw extruder.

2. The glass fibers are saturated with a dilute solution of the organopolysiloxane in, for example, methylene chloride and dried at 120° C. in vacuo. The glass fiber-polysiloxane mixture thus obtained is then incorporated into the polycarbonate melt by a known process in a kneader or a twin screw extruder.

In principle, process 1 can also be carried out in one process step by mixing the polycarbonate homogeneously with the polysiloxane and the glass fiber using customary techniques, such as a twin screw extruder.

The starting materials used in the examples are characterized as follows.

I. Preparation of a polycarbonate

About 454 parts of 4,4'-dihydroxydiphenyl-2,2-propane and 9.5 parts of p-tert.-butylphenol are suspended in 1.5 l of water. In a 3-necked flask, fitted with a stirrer and a gas inlet tube, the oxygen is removed from the reaction mixture by passing nitrogen through the reaction mixture for 15 minutes, whilst stirring. 355 parts of 45% strength sodium hydroxide solution and 1,000 parts of methylene chloride are then added. The mixture is cooled to 25° C. While maintaining this temperature by cooling, 237 parts of phosgene are added over a period of 120 minutes. An additional amount of 75 parts of a 45% strength sodium hydroxide solution is added after 15–30 minutes, after the absorption of phosgene has started. 1.6 parts of triethylamine are added to the solution which has formed and the mixture is stirred for a further 15 minutes. A highly viscous solution is obtained, the viscosity of which is regulated by adding methylene chloride. The aqueous phase is separated off. The organic phase is washed salt-free and alkali-free with water. The polycarbonate is isolated from the washed solution and dried. The polycarbonate has a relative viscosity of 1.29–1.30, measured in a 0.5% strength solution of methylene chloride at 20° C. This corresponds approximately to a molecular weight of 32,000. The polycarbonate thus obtained is extruded and granulated.

The following polycarbonates were employed:

(A) An aromatic polycarbonate based on 2,2-bis-(4-hydroxyphenyl)-propane (Bisphenol A) with a relative viscosity of 1.31.

(B) An aromatic polycarbonate based on 90 mol% of bisphenol A and 10 mol% of 2,2-bis-(4-hydroxy-3,5-dibromophenyl)-propane (tetrabromobisphenol A) with a relative viscosity of 1.30.

(C) An aromatic polycarbonate based on 70 mol% of bisphenol A and 30 mol% of 2,2-bis-(4-hydroxy-3,5-dimethylphenyl)-propane (tetramethylbisphenol A) with a relative viscosity of 1.32.

II. Glass fibers (D) Ground short glass fiber; average length of fiber 230 μm, φ 10 μm, powder content (<50 μm) 5%.

(E) Long glass fiber; average length of fiber 6.0 mm, φ 10 μm, powder content (<50 μm) about 1%.

III. Organopolysiloxanes

Preparation of an organopolysiloxane

A. 200 ml of dimethyldichlorosilane are added slowly dropwise, from a dropping funnel provided with a CaCl$_2$ tube, to 600 ml of H$_2$O at 15°–20° C., which is stirred vigorously with a turbine impeller. When the addition is complete, the oily organic layer is taken up in 150 ml of ether, separated off from the aqueous phase and dried over MgSO$_4$. After evaporating off the solvent, an oily residue remains which consists in the main of cyclic products having degrees of polymerisation n of 3–9 but which also contains linear fractions and probably also high-molecular cyclic fractions.

In order to separate the individual constituents of the mixture, the entire residue of about 100 ml is subjected to fractional distillation. The approximate % contents of the individual compounds and their boiling points are as follows: n=3:0.5%, 134° C./760 mm Hg (melting point 64° C.); n=4:42%, 175° C./760 mm Hg, 74° C./20 mm Hg (melting point 17.5° C.); n=5:6.7%, 101° C./20 mm Hg (melting point-38° C.); and n=6:1.6%, 128° C./20 mm Hg (melting point-3° C.). The trimer and the tetramer can be distilled readily at normal pressure. About half of the entire product consists of trimers to hexamers.

B. The higher molecular distillation residue is a viscous oil which, by heating to 350° C. in a slow stream of nitrogen by means of a metal bath is pyrolysed to trimeric and tetrameric fractions. Only traces distil at temperatures up to 350° C. Between 350° and 400° C. the liquid in the flask starts to boil, whereupon a distillate of 135°–210° C. passes over. If heating at 400° C. is continued for a relatively long time almost the entire contents of the flask distil. The distillate, in all about 40 ml, is a mixture of liquid and crystals. It consists of the extent of about 44% of cyclic trimers and to the extent of 24% of cyclic tetramers, while the remainder is composed of pentamers and higher oligomers. The mixture which is present can be fractionated, as described in A.

C. A flask or a bottle is charged with 20 ml of octamethylcyclotetrasiloxane, 3.7 of concentrated H$_2$SO$_4$ and 10 ml of ether and the reaction vessel is closed and shaken for one day at room temperature. 20 ml of ether and 10 ml of H$_2$O are then added to the highly viscous mixture and the mixture is shaken for 1 hour. The aqueous layer is then withdrawn and the ethereal solution is washed 3 times with portions of 10 ml of H$_2$O and dried over anhydrous K$_2$CO$_3$. The ether is now distilled off the solvent via a Claisen flask and the temperature in the distillation flask is raised to 310° C. by means of a metal bath, a small amount of distillate passing over. The residue in the flask consists of a transparent viscous oil, which is soluble in various hydrocarbons or ethers. If the purified tetramer [(CH$_3$)$_2$SiO]$_4$ was used as the starting material the cryoscopic determination of the molecular weight in cyclohexane should give a value of about 2,740, which corresponds to 37 (CH$_3$)$_2$SiO structural units.

The following polysiloxanes were employed:

(F) Polydimethylsiloxane with —Si—OH— end groups which has a viscosity of 30 cSt at 20° C.

(G) Polydimethylsiloxane with a viscosity of 100 cSt at 20° C. and a density of 0.97 g/cm$^3$ at 20° C.

(H) Polymethylphenylsiloxane with a viscosity of 200 cSt at 20° C., a density of 1.03 g/cm$^3$ at 20° C. and a refractive index of 1.466.

EXAMPLES 1–12

An aromatic polycarbonate dried for 24 hours at 120° C. is melted in a twin screw extruder at temperatures between 300° and 330° C. Then either the glass fiber which has been saturated with the polysiloxane and subsequently dried is metered into the polycarbonate melt or the glass fiber and the polysiloxane are metered separately direct into the polycarbonate melt. The polymer strand is cooled under water, granulated and converted to injection mouldings by techniques customary for polycarbonate.

Composition of the glass fiber-reinforced polycarbonates of Examples 1–12.

| Starting material | (% by weight) | Examples | | | | | | | | | | | |
| --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 |
| Polycarbonate A | | 70 | 69.5 | 68.5 | 69 | — | — | — | — | — | — | 45 | 47 |

| Starting material | (% by weight) | 1 | 2 | 3 | 4 | 5 | 6 | 7 | 8 | 9 | 10 | 11 | 12 |
|---|---|---|---|---|---|---|---|---|---|---|---|---|---|
| Polycarbonate B | | — | — | — | — | 80 | 78 | 77 | 79.5 | — | — | — | — |
| Polycarbonate C | | — | — | — | — | — | — | — | — | 80 | 78 | — | — |
| Glass fibers D | | 30 | 30 | 30 | 30 | — | — | — | — | 20 | 20 | 50 | 50 |
| Glass fibers E | | — | — | — | — | 20 | 20 | 20 | 20 | — | — | — | — |
| Polysiloxane F | | — | — | 1.5 | — | — | — | 3 | — | — | — | 5 | — |
| Polysiloxane G | | — | 0.5 | — | — | — | 2 | — | — | — | 2 | — | — |
| Polysiloxane H | | — | — | — | 1 | — | — | — | 0.5 | — | — | — | 3 |

Some of the characteristic properties are summarized in the table which follows.

| | $\eta_{rel}$: Relative viscosity | Impact strength KJ/m² according to DIN 53,453 | Notched impact strength according to DIN 53,453 | Elongation at break % according to DIN 53,455 | Modulus of elasticity M Pa according to DIN 53,457 |
|---|---|---|---|---|---|
| Example 1 (Comparison example) | 1.30 | 35 | 7 | 3.5 | 6,000 |
| Example 2 | 1.30 | 90 | 15 | 55 | 6,000 |
| Example 3 | 1.31 | not broken | 22 | 60 | 5,800 |
| Example 4 | 1.33 | 85 | 14 | 50 | 6,000 |
| Example 5 (Comparison example) | 1.28 | 48 | 12 | 3.4 | 5,500 |
| Example 6 | 1.29 | 80 | 18 | 40 | 5,500 |
| Example 7 | 1.30 | not broken | 30 | 60 | 5,300 |
| Example 8 | 1.29 | 70 | 14 | 40 | 5,450 |
| Example 9 (Comparison example) | 1.30 | 65 | 9 | 10 | 4,000 |
| Example 10 | 1.31 | 80 | 15 | 65 | 4,200 |
| Example 11 | 1.31 | 70 | 11 | 10 | 8,000 |
| Example 12 | 1.30 | 65 | 9 | 8 | 8,500 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Thermoplastic moulding compositions consisting of
   A. about 45-89.5% by weight of high molecular weight, thermoplastic polycarbonates based on diphenols having weight-average molecular weights, $\overline{M}_w$, between about 10,000 and 100,000,
   B. about 10-50% by weight of glass fibers, and
   C. about 0.5-5% by weight of organopolysiloxanes having a viscosity between about 5 and 300,000 cSt at 20° C. which are obtained by hydrolysis or cohydrolysis of the monomers

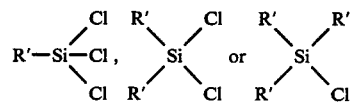

in which

R', which may be the same or different, is H, $C_1$-$C_6$ alkyl or phenyl, and the sum of the percentages by weight of A+B+C being 100 in each case.

2. Thermoplastic moulding compositions according to claim 1, consisting of
   A. about 45-79.5% by weight of high molecular weight, thermoplastic polycarbonates,
   B. about 20-50% by weight of glass fibers, and
   C. about 0.5-5% by weight of organopolysiloxanes.

* * * * *